United States Patent [19]

Willinger et al.

[11] 3,859,961

[45] Jan. 14, 1975

[54] ANIMAL PATH CONNECTING SYSTEM

[75] Inventors: Allan H. Willinger, New York; Albert J. Dinnerstein, Brooklyn, both of N.Y.

[73] Assignee: Metaframe Corporation, East Patterson, N.J.

[22] Filed: July 20, 1973

[21] Appl. No.: 381,034

Related U.S. Application Data

[63] Continuation-in-part of Ser. No. 219,767, Jan. 21, 1972, Pat. No. 3,791,346.

[52] U.S. Cl. ................................................ 119/15
[51] Int. Cl. ............................................. A01k 1/00
[58] Field of Search ................... 119/15, 17, 19, 1; 138/117, 120, 121, 155, 38

[56] References Cited
UNITED STATES PATENTS

| | | | |
|---|---|---|---|
| 266,677 | 10/1882 | Corbett | 138/117 X |
| 1,459,476 | 6/1923 | Meredith | 138/117 |
| 2,795,208 | 6/1957 | Rasmussen | 119/15 |
| 3,367,308 | 2/1968 | Quattrone et al | 119/15 |
| 3,742,908 | 7/1973 | Merino | 119/15 |

Primary Examiner—Hugh R. Chamblee
Attorney, Agent, or Firm—Max E. Shirk

[57] ABSTRACT

An animal path connecting system includes both elongate as well as T-shaped and L-shaped tubular members. Each tubular member is made from a transparent plastic and is formed of semi-cylindrical sections. Each tubular member is provided with open end portions defining axes substantially coextensive in a common plane. The tubular members each comprise two mating half sections separable from each other at the common plane along lateral edges extending between adjacent sides of open end portions. The opposing lateral edges of associated sections substantially abut against one another in the assembled condition of said tubular members while permitting flow of fluid to escape through the opposing lateral edges. A connecting ring provided with two annular spaced ridges releasably cooperates with two opposing end portions of two tubular members for connecting the two mating half sections of each of the tubular members to one another. The ring further secures the two tubular members to one another. The open end portions and the connecting ring are so configurated so as to require less force for interconnection of the tubular members than separation thereof. The tubular members are provided with recesses and projections along the lateral edges which locate the two mating half sections with respect to the other and prevent relative movement therebetween and with internal ribs which facilitate traction of the animals within the tubular members.

24 Claims, 26 Drawing Figures

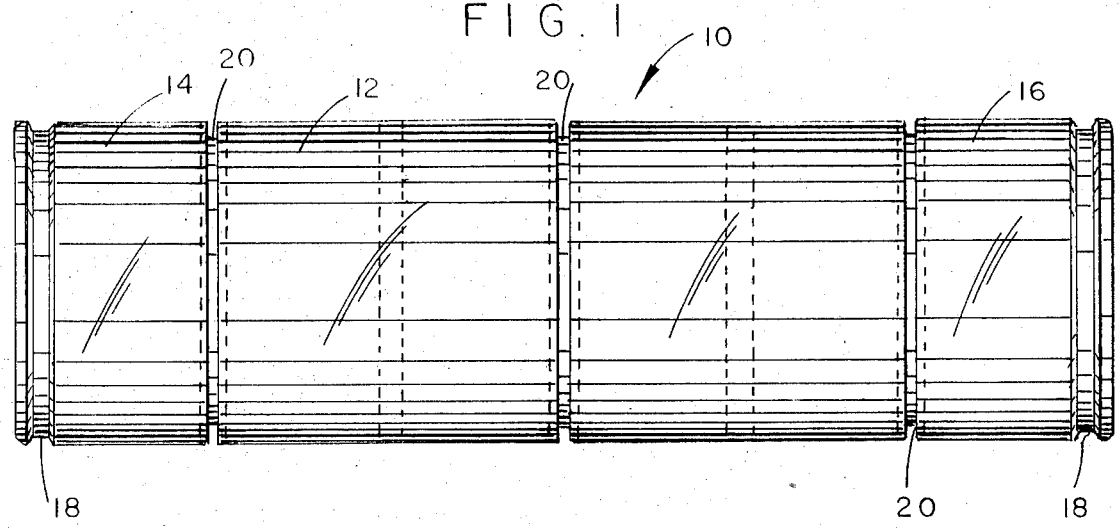
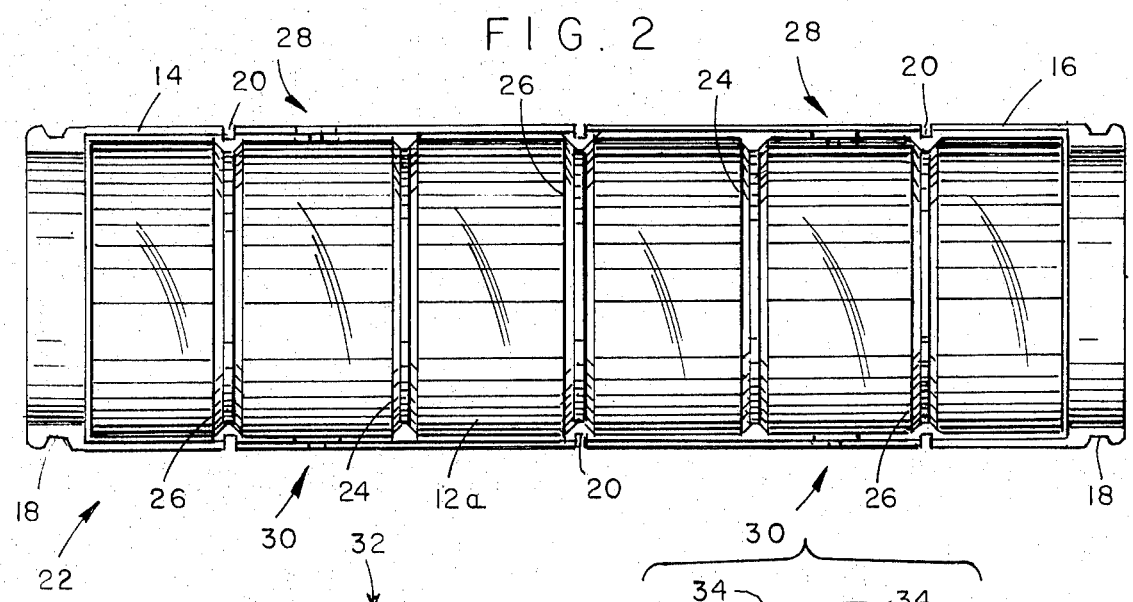
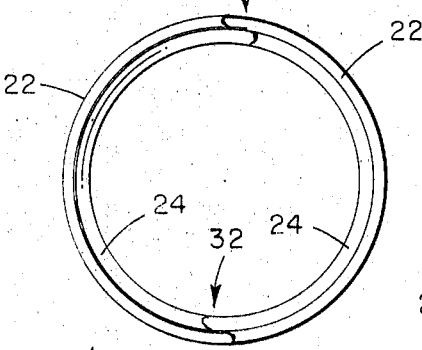
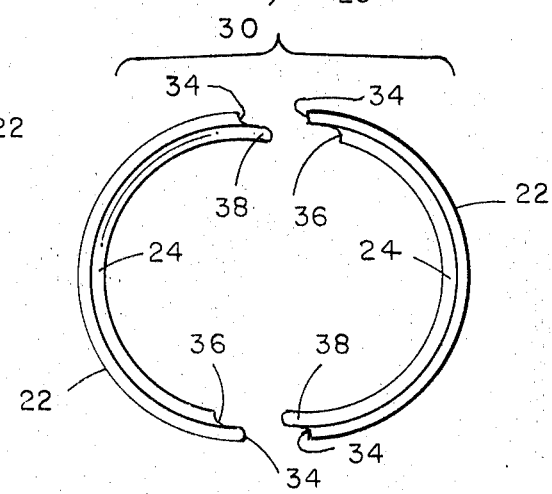

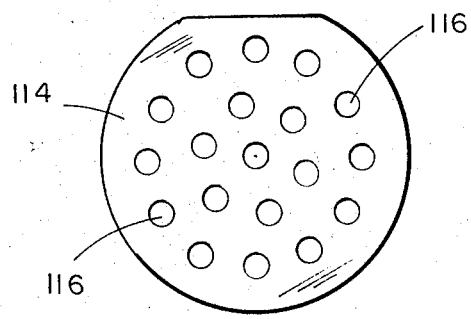
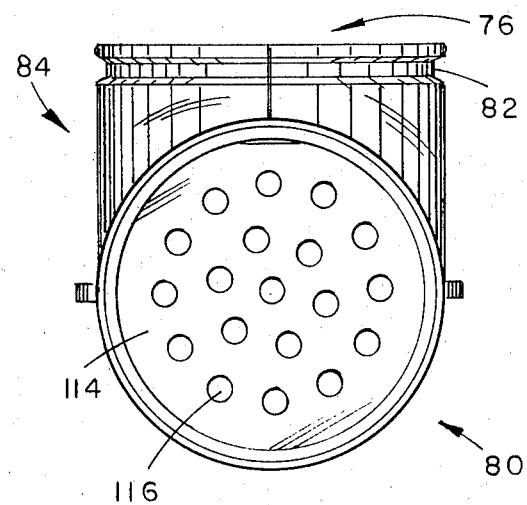
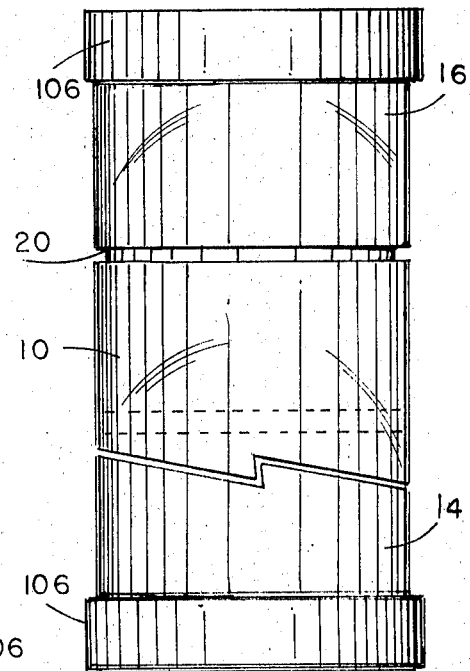
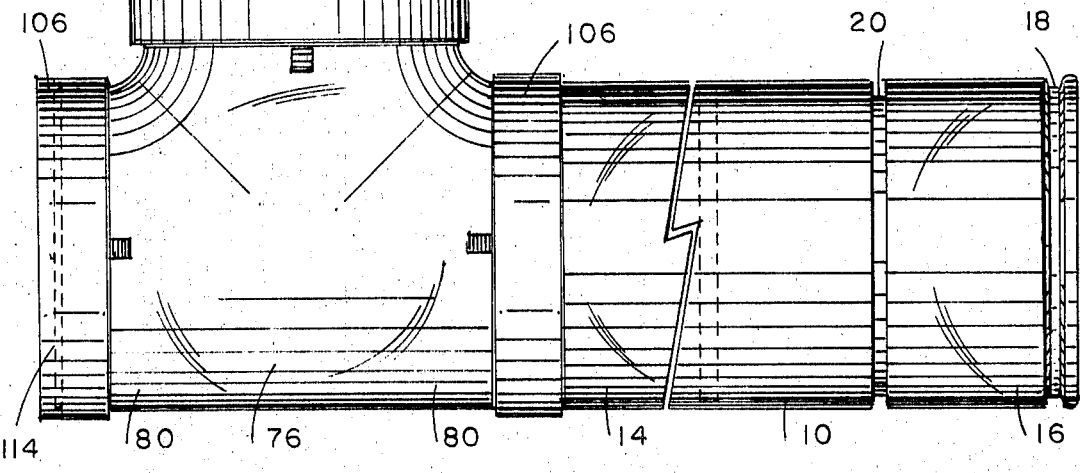

ANIMAL PATH CONNECTING SYSTEM

CROSS REFERENCES TO RELATED APPLICATION

This application is a continuation-in-part of U.S. Application Ser. No. 219,767, filed Jan. 21, 1972, now U.S. Pat. No. 3,791,346.

BACKGROUND OF THE INVENTION

The present invention generally relates to structures for confining and observing animals, and more particularly to an animal path connecting system which is simple to assemble and maintain and which provides numerous possible combinations of animal paths.

Various structures used by hobbyists for confining animals of the rodent variety are well known. Typically, the enclosures are in the form of cages which confine the animal to a single unit.

Also known are animal housings which are interconnected by rubber or flexible hose or the like for permitting animals to move between one enclosure and another. Thus, an entomological observation device is known which utilizes the flexible transparent plastic tubing to interconnect several units to allow insects, such as ants, to move between one unit and another. Other interhousing connecting tubes knownn in the prior art are complex in construction and inconvenient to assemble.

Because most prior art tubing is fully closed except at the ends thereof, it is difficult to clean the interiors of the tubes at frequent intervals. Consequently, waste materials as well as other materials accumulate within the tubes — this creating a dirty environment for tha animals as well as producing undesirable odors.

In this connection, it should be pointed out that most prior art tubes do not permit the escape of liquid waste materials discharged by the animals within the tubes. Frequently, therefore, the waste materials accumulate within the tubes, this creating an unpleasant and unhealthy environment for the animals.

A further disadvantage of many of the prior art conduits or tubes for interconnecting observatory enclosures is their lack of flexibility in interconnection to produce various passageway combinations. Because the number of passageways are limited, the hobbyist, usually a child, frequently becomes disinterested or bored with any same arrangement of passageways.

A still further disadvantage of the prior art tubes or conduits utilized to interconnect animal housings has been the fact that they have not permitted, in a simple fashion, to provide barriers in a tube to prevent an animal to move between two particular housings at any particular time.

SUMMARY OF THE INVENTION

It is an object of the present invention to provide an animal path connecting system which does not possess the above described disadvantages associated with comparable prior art systems.

It is another object of the present invention to provide an animal path connecting system which is simple in construction and economical to manufacture.

It is still another object of the present invention to provide a system of the type under discussion which comprises tubes made of separable compatable halves, which, in the presently preferred embodiment, are identical.

It is yet a further object of the present invention to provide connecting means which connects two mating halves forming a tube to one another, the connecting means further being adapted to secure two tubes to one another.

It is a further object of the present invention to provide a system of the type under discussion which easily incorporates ventilating as well as conduit barrier means for respectively ventilating and providing inter-tube barriers for preventing an animal from traversing from one tube to another.

It is still a further object of the present invention to provide an animal path connecting system which includes variously shaped tubular members which are interconnectable with one another by means of suitable conduit connecting means.

It is yet a further object of the present invention to provide an animal path connecting system which comprises tubular members each formed of two mating halves separable at a seam, the mating halves being substantially in abutment against the one another in the assembled condition of the tubular members while permitting fluid waste materials to escape through the seam.

It is yet a further object of the present invention to provide an animal path connecting system which provides flexibility in the manner in which the tubular members are connected to provide a numerous variety of possible interconnections and numerous passageway arrangements.

It is an additional object of the present invention to provide an elongate tubular member which are provided with spaced annular grooves on the exterior surface thereof which are engageable with a tab of a housing having an opening in an upper wall thereof, wherein the tab is receivable in one of the annular grooves at variable vertical positions of the tubular member within the opening.

It is still an additional object of the present invention to provide an animal path connecting system which includes locating means for facilitating assembly of the mating halves of the tubes.

In order to achieve the above objects, as well as other which will become apparent hereafter, an animal path connecting system in accordance with the present invention comprises a plurality of transparent tubular members each provided with open end portions defining axes substantially coextensive in a common plane. Each tubular member comprises two mating half sections separable from each other at said common plane along lateral edges extending between adjacent open end portions. The opposing lateral edges of associated sections substantially abut against one another in the assembled condition of said tubular member. Connecting means are provided for releasably cooperating with said end portions for connecting two mating half sections of a tubular member to one another, said connecting means further being adapted to secure two tubular members to one another.

In accordance with a presently preferred embodiment, each of said mating half sections are semi-cylindrical in shape. Elongate tubular members, having two opposing open end portions, as well as T-shaped members, having two opposing end portions and an intermediate open end portion, are provided which are readily interconnectable with one another to form numerous possible path or passageways combinations.

The connecting means in accordance with the present invention advantageously comprises a connecting ring made of a resilient material which is provided with annular ridges which are snappingly receivable into corresponding or complimentary annular recesses provided at each open end portion. The annular recesses provided at the open end portions as well as the ridges of the connecting rings are provided with abutting surfaces which are tapered and inclined in a manner to facilitate interconnection while hampering disconnection thereof.

The mating half sections mate with each other with some clearance between corresponding opposing lateral edges when said tubular members are assembled. In this manner, liquid may flow from the interior to the exterior of the tubular members.

Interlocking means in the forms of opposing tabs and recesses or pins and holes are provided on opposing lateral edges to accurately locate the two associated half sections to facilitate interconnection thereof with the connecting means.

Another feature of the present invention is the provision of ribs which project from the internal surfaces of the tubular members. The ribs facilitate traction of the animals within the tube members. The ribs project from the internal surfaces a distance sufficiently small to prevent gnawing of said ribs by said animals. Also to this end, for example, the tubular members as well as the ribs can be made from clear polystyrene.

A yet further feature of the present invention is the provision of apertured plates which can be disposed between interconnecting end portions to provide barrier means therebetween for the animals. Alternately, an apertured plate may be provided at an end portion which does not cooperate with a further tubular member, the apertured plate there being provided to permit air to flow into and out of the tubular member to ventilate the same.

Where the tubular member is utilized in combination with a housing provided with an upper opening, a tubular member may be elongate and provided with spaced annular grooves. In this manner, when the tubular member is vertically disposed through the opening, the vertical position of the tubular member can be adjustably selected by engaging suitable detent means fixed on said housing with a respective one of the grooves.

BRIEF DESCRIPTION OF THE DRAWINGS

With the above and additional objects and advantages in view, as will hereinafter appear, this invention comprises the devices, combination and arrangements of parts hereinafter described and illustrated in the accompanying drawings of a preferred embodiment in which:

FIG. 1 is a side elevational view of a tubular member in accordance with the present invention, shown in the assembled state;

FIG. 2 is a side elevational view of a cylindrical half section of the tubular member shown in FIG. 1, showing the interior surface thereof and the ribs formed thereon;

FIG. 3 is a front elevational view of the tubular member shown in FIG. 1;

FIG. 4 is similar to FIG. 3, but shown with the half sections separated from one another prior to assembly or after disassembly;

FIG. 23 is a top plan view of an apertured ring in accordance with the present invention which is utilized both as barrier and ventilating means;

FIG. 24 is similar to FIG. 15, but shown with the apertured ring of FIG. 23 inserted therein;

FIG. 25 is similar to FIG. 16, but shown with an apertured ring of FIG. 23 mounted in the intermediate open end portion of the T-section; and FIG. 26 illustrates a possible animal path connecting system and the manner in which the tubular members of FIG. 1 and T-section of FIG. 14 are connected to one another by means of the connecting rings shown in FIGS. 21 and 22.

DETAILED DESCRIPTION OF THE PREFERRED EMBODIMENTS

Figure 5:
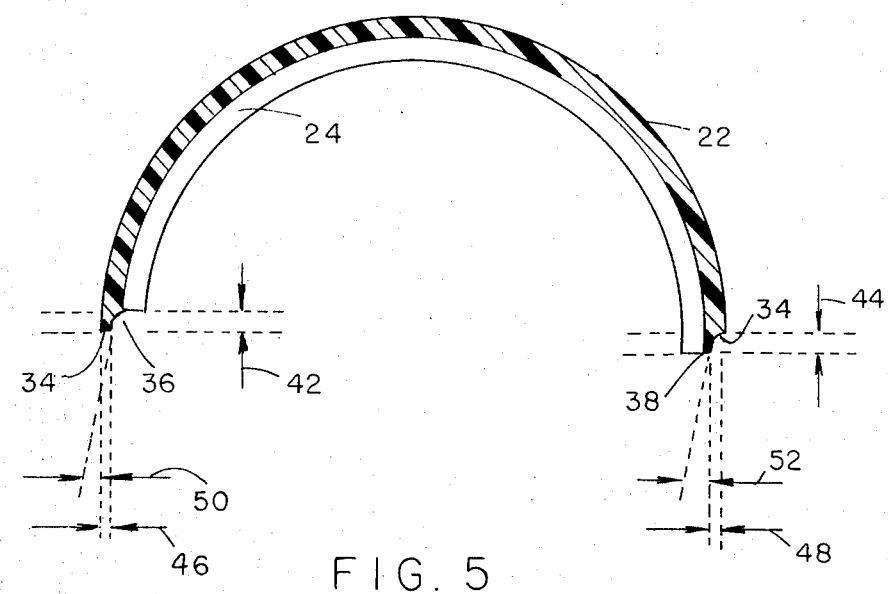
FIG. 5 is an enlarged cross sectional view of one half section such as shown in FIG. 2, showing some of the dimensional details of the half sections.

Referring now specifically now to the drawings, in which the same reference numerals have been utilized to designate similar or identical parts throughout, and first referring to FIGS. 1–4, a tube assembly in the form of a tubular member is generally designated by the reference numeral 10. The tubular member 10, while itself forming an important feature of the present invention, also forms part of an animal path connecting system which is easy to assemble and rearrange, as will become evident hereafter, to provide numerous path combinations for an animal.

The tubular member or tube 10 is, in accordance with the presently preferred embodiment, cylindrical in form. However, it will become clear, from a reading of the text that follows, that the present invention can easily be implemented with rectangular or square tubes, with varying degrees of advantage. In fact, any cross sectional configuration of the tubes may be utilized. Those skilled in the art will readily be capable of modifying the structure herein described when utilizing alternate desired tubes having different cross sections.

The tube 10 has opposing open end portions 14 and 16 made sufficiently large to permit an animal to move into and out of the tube 10. Annular end recesses 18, provided at the respective open end portions 14 and 16, are similar in construction and will further be described hereafter. The end annular recesses, 18 are provided in the external peripheral surfaces of the end portions 14, 16 and form part of the interlocking or interconnecting mechanism by which the tubes are assembled.

Further grooves 20 are optionally provided along the length of the tube 10 which are advantageously uniformly spaced from one another. When utilized with a housing provided with an upper opening, the tube 10 may be vertically disposed through the opening. The vertical position of the tube 10 can be adjustably selected by engaging suitable detent means, in the form of a tab, (not shown) fixed on the housing with one of the grooves 20. While the annular recesses 18 are provided with tapered abutting surfaces, the opposing surfaces of the grooves 20 are not tapered but are substantially parallel to one another.

An important feature of the present invention is the specific construction of the tubes 10 wherein each tube comprises compatable or mating sections, and preferably compatable halves 22 as suggested in FIG. 4. According to the presently preferred embodiment, the half sections 22 defining each tube 10 are identical and may be made by the same mold. Because of the structural features to be described, the mating half sections are connectable with one another.

As best shown in FIG. 2, the tube 10 is provided on the interior surface 12a thereof with a plurality of spaced parallel rib segments 24 which, when two mating half sections 22 are joined, form annular ribs along the interior surface 12a. Narrow rib segments 24 and wide rib segments 26 are alternately provided. However, the provision of alternate narrow and wide rib segments as shown is not a critical feature of the present invention. For example, all narrow or all wide rib segments can be provided. However, because of the provision of the external grooves 20, wide annular ribs 26 are provided extending along the grooves 20 but on the exterior surface of the tube 10 to provide added strength at points where the external surface thereof is weakened by the grooves 20. Clearly, when the optional grooves 20 are omitted, it is not necessary to provide wide annular rib segments 26 and all the rib segments can be similarly dimensioned. Advantageously, the rib segments 24 and 26 project from the internal surface 12a a distance sufficiently small to prevent gnawing of the ribs by rodent type animals. To this end, the ribs as well as the half sections 22 are made from a gnaw-resistant material such as clear polystyrene.

As suggested in FIG. 2, and as to be more further described hereafter in connection with FIGS. 7–12, each mating half section 22 is provided with interlocking means 28 and 30 on diametrically opposing lateral edges. In this manner, the mating half sections can be accurately located one with respect to the other prior to connection by the connecting means to be described in connection with FIGS. 21 and 22.

Referring specifically to FIGS. 3–6, the construction of the two path sections 22 is shown which permits the half sections to be joined without transverse relative movement therebetween. The presently preferred connection for this purpose is a ship-lap connection 32. To achieve such a connection, the lateral edges 34 extending longitudinally along the half sections, are provided with lateral longitudinal inner recesses 36 which are adapted to matingly receive inner longitudinal lateral lips 38. It will be noted, for example in FIG. 4, that each half section 22 is provided with a lateral inner recess 36 at one lateral edge 34 thereof and an inner lateral lip 38 at a diametrically opposite lateral edge thereof. Thus, it will be noted that the two half sections 22 shown in FIG. 4 are identical. This can most easily be observed by rotating one of the half sections 22 180° about its axis. In this sense, the half sections 22 are polarized. The half section 22 will join in a ship-lap connection when the tubes are disposed as shown in FIG. 4. Clearly, when one of the tubes is reversed or rotated 180° about a transverse axis to bring the inner lateral recesses as well as the lateral inner lips 38 in opposition to one another, the above described mating connection is not achievable. To eliminate the polarizing characteristic of the tube half sections, it is merely necessary to eliminate the inner lateral recesses and lips 36, 38 respectively. Most of the objects of the present invention are still achievable in the absence of the ship-lap connection above described.

Figure 6:
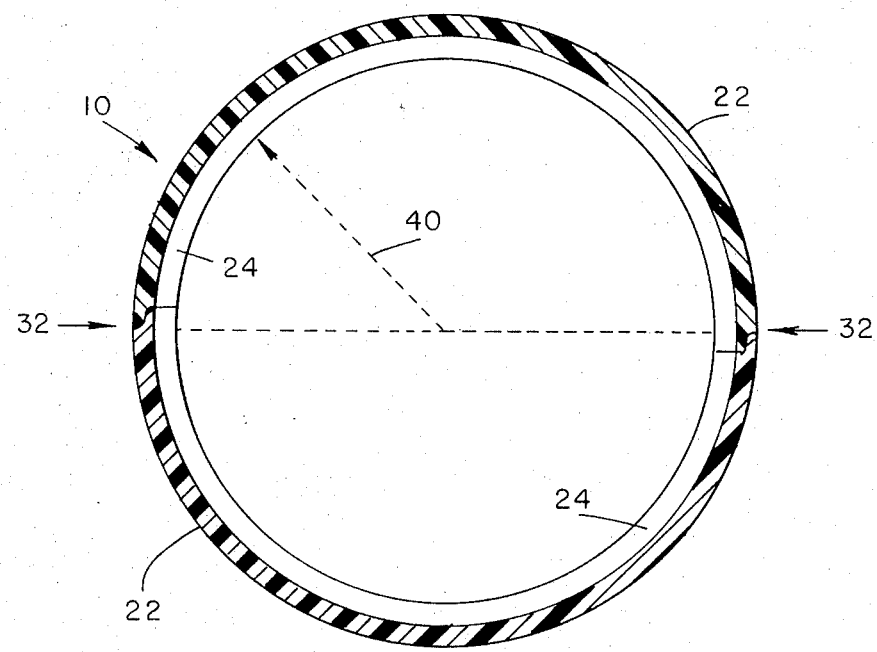
FIG. 6 is an enlarged cross sectional view of an assembled tubular member, shown in FIG. 1, showing some dimensional details thereof.

Some of the dimensional details of the ship-lap connection and of the tube 10 are given in FIGS. 5 and 6. According to the presently preferred embodiment, wherein the tubes 10 are utilized in connection with gerbils and comparably sized rodent type animals, the radius 40 for the tube 10 is selected to be approximately 1 inch. Referring to FIG. 5, the lateral edges 34 are shown. The lateral recess 36 as well as the lateral lip 38 are shown to have heights 42 and 44 respectively which are approximately equal to one another. It has been found, that a height 42 of 0.06 inch and a height 44 of 0.05 inch is satisfactory. The transverse dimensions of the lateral edges on diametrically opposing sides of the tube are given by the thicknesses 46 and 48 which are each selected to be approximately 0.04 inch. To facilitate the mating of the two half sections into the ship-lap connection, an angle 50 defined by the recess 36 is selected to be approximately equal to the angle 52 defined by the lateral lip 38. It has been found that an angle 50 of approximately 10° and an angle 52 of approximately 13° provides satisfactory results.

Figure 20:
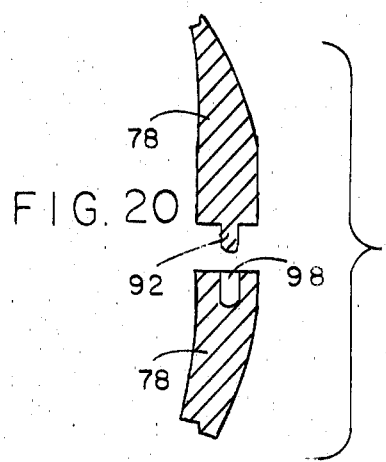
FIG. 20 is a fragmented representation of a pin hole provided on opposing lateral edges of the T-section half sections to locate the sections relative to one another prior to being locked by suitable connecting means.

While the above described ship-lap joint is satisfactory and forms part of the presently preferred embodiment, it should be clear that any other joint between the two half sections which prevents relative transverse movements is equally satisfactory and may be utilized where more desirable. Thus, it is equally possible to utilize pins and holes, as to be described hereafter in connection with FIGS. 17, 18 and 20, as well as tongue and groove joints.

Advantageously, the mating half section 22 mate with one another with some clearance between corresponding opposing lateral edges 34 when the tubular members 10 are assembled. In this manner, liquid may flow from the interior to the exterior of the tubular members. This forms an important feature of the present invention since it permits the escape of liquid waste materials. To achieve this result, the tubes 10 are arranged, in their finally assembled positions so that the lateral edges 34 forming the seams between the half sections are aligned along a vertical direction. Any liquid waste material deposited on the interior of the tube will escape through the lower seam.

In this connection, an important feature of the present invention is the separability of the half sections 22 as above described. This feature permits frequent periodic cleaning of the interiors of the tubes to remove ay liquid as well as solid waste materials deposited therein. This flexibility for periodic cleaning not only improves the environment for the animals but prevents the formation of undesirable odors.

Figure 7:
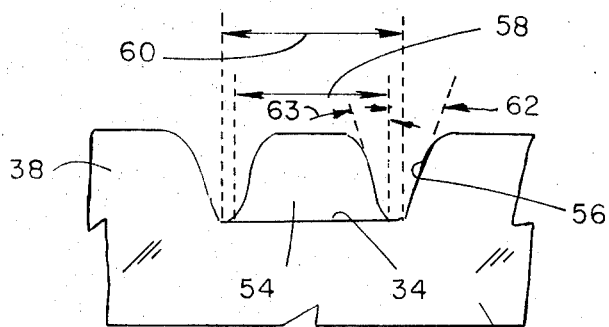
FIG. 7 is a fragmented elevational view of a tab and recess forming interlocking means for locating two half sections relative to one another.
Figure 8:
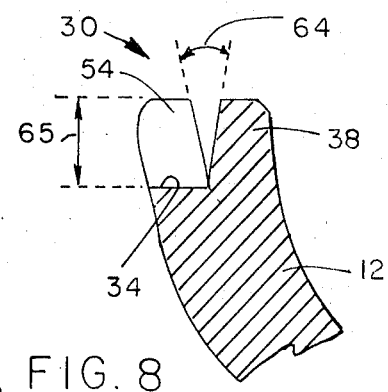
FIG. 8 is a fragmented end elevational view of the interlocking means shown in FIG. 7.
Figure 9:
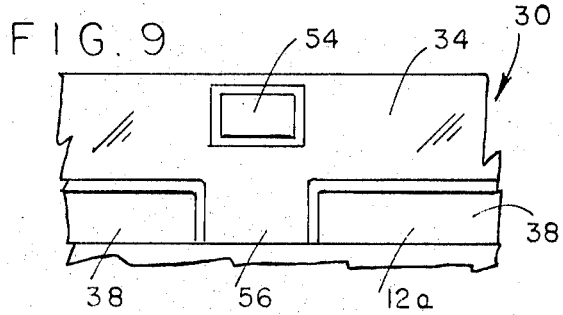
FIG. 9 is a fragmented top plan view of the interlocking means shown in FIGS. 7 and 8.

As above described, interlocking means 28 and 30 are provided along the lateral edges 34 of the half sections. Referring to FIGS. 7-9, the details of the interlocking means 30 are shown. As will be clear from the description that follows, the interlocking means comprise alternate projections or tabs and recesses in the inner recesses 36 and lips 38 respectively, when the latter are provided Thus, the interlocking means 30 comprises a tab 54 which projects upwardly from the lateral edge 34 to a height corresponding or approximately equal to that of the lateral lip 38. Further, a recess 56 is provided in the lateral lip 38 which extend down to the lateral edge 34 and has a longitudinal dimension which is slightly greater than that of the tab 54. This is depicted in FIG. 7 by the numerals 58 and 60 which respectively represent the effective widths of the tab 54 and that of the recess 56.

To facilitate location of a tab 54 with a corresponding recess 56, the tabs as well as the recesses are tapered as depicted by the angles 62 and 63. An angular separation 64 is also provided between the tab 54 and the lateral lip 38, this further facilitating location and insertion of a tab into a respective recess. While merely illustrative, dimensions which have been found suitable have included a distance 58 equal to 0.10 inch and a distance 60 equal to 0.125 inch. Typically, angles of approximately 15° have proved satisfactory for angles 62 and 63 while an angle 64 of approximately 4° has proved satisfactory. Finally, a distance 65, representing the height of the tabs 54 and recesses 56 of approximately 0.06 inch have provided good results.

Referring to FIG. 9, the above described interlocking means 30 is shown as viewed in the direction of the lateral edge 34. It will be noted that normally, with the ship-lap connection, the lateral lip 38 extends continuously along the lateral edge 34. Instead, a recess 56 is formed therein to interrupt the lateral lip 38 and, opposite to the recess 56, a tab 54 is provided which has approximately the same dimensions as the recess 56, as modified by the various tapers discribed in connection with FIGS. 7 and 8.

Figure 10:
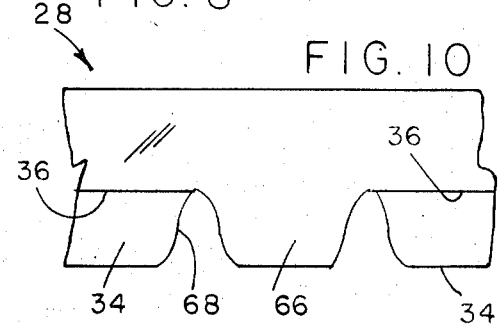
FIG. 10 is similar to FIG. 7, but showing the complimentary interlocking means provided on a diametrically opposite lateral edge of the tube half sections.
Figure 12:
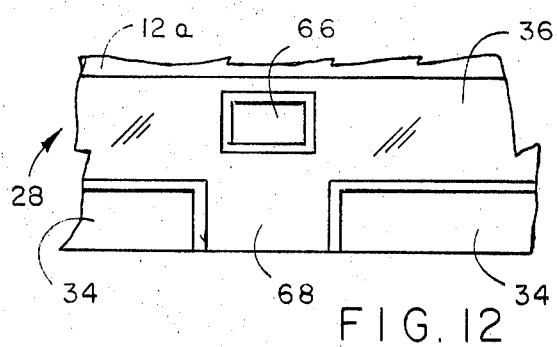
FIG. 12 is a top plan view of the interlocking means shown in FIGS. 10 and 11.
Figure 11:
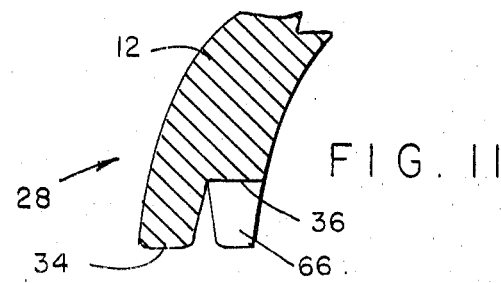
FIG. 11 is an end elevational view of the interlocking means shown in FIG. 10.
Figure 14:
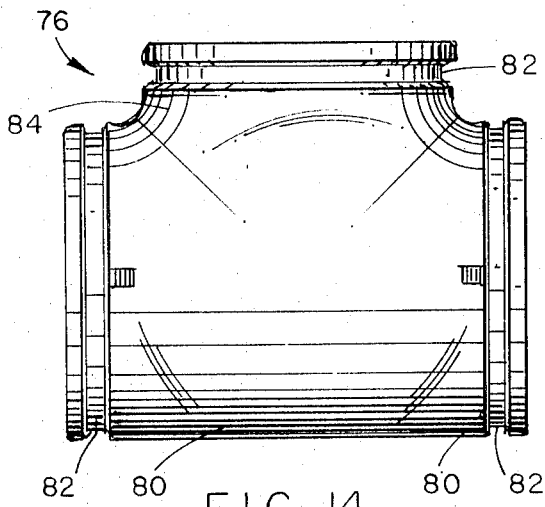
FIG. 14 is a side elevational view of a T-shaped tubular member in accordance with the present invention.

The interlocking means 28 shown in FIGS. 10-12 is almost identical with the interlocking means 30 above described. However, in the instance of the interlocking means 28, a projecting tab 66 projects within the lateral inner recess 36 while a recess 68 is provided in the lateral edge 34. Of importance, however, is that while the tab 54 is near the outside surface of the tube, the tab 66 is near the inside surface 12a. on the other hand, while the lateral lip 38 is adjacent to the inner surface or interior wall 12a, the lateral edge 34 and the recess 68 are adjacent to the outside surface of the tube. For this reason, when mating half sections 22 are brought into abutment against one another, the tabs 54 become oppositely disposed to the recesses 68 while the tabs 66 are oppositely disposed to the recesses 56. The lateral lip 38 and the lateral inner recess 36 continue to mate in the ship-lap joint connection as above described. However, the interlocking of the tab 54 and the recess 68 as well as the tab 66 and the recess 56 prevents the longitudinal displacement of one half section 22 relative to the other.

Figure 13:
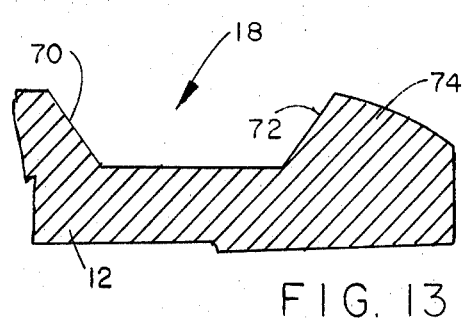
FIG. 13 is a fragmented elevational view of an open end portion of a tubular member, showing the locking recess and the inclined surfaces which facilitate insertion and make more difficult disengagement of the open end portion with a complimentary annular ridge of a suitable connecting means.

A cross section of the above mentioned end recess 18 is shown in FIG. 13. Each end recess 18 comprises two opposed abutting surfaces 70 and 72, which are each inclined or tapered in the direction of the other opposing surface. An outwardly facing tapered engagement surface 74 is provided. The end recess 18 comprises an external peripheral surface which extends about the open end portions 14, 16 and defines a predetermined annular configuration. The recess 18 is adapted to receive in locking engagement a connector as to be more fully described hereafter. The tapered engagement surface 74 will be described as substantially facing away from the tubular member while the adjacent tapered annular abutment surface 72 will be described as substantially facing an opposed direction to the outward direction. The abutment surface 72 defines a generally greater angle with respect to the axis of the respective open end portion than that formed between the axis and the engagement surface 74. In this manner, engagement of the connecting means to be described with the open end portion requires less force than for disengagement thereof. Stated otherwise, the tapered engagement surface 74 has a more gradual slope than the steeper slope of the abutment surface 72. Thus, once a ridge or complimentary locking device is snappingly received within the end recess 18, removal of the ridge is hampered or made more difficult.

Referring to FIGS. 14-18, a further tubular member in the form of a T-section 76 is illustrated. The tubular member 76 as well as the tubular member 10 comprise structural elements which can be assembled as to be described hereafter.

The tubular members 76 have a substantially cylindrical wall 78 with opposed open end portions 80 each provided with an annular end recess 82. The tubular member 76 is T-shaped and has an intermediate open end portion 84 which has an axes substantially normal to the axes defined by the two opposing open end portions 80. It should be clear that a person skilled in the art could make the necessary modifications to form an L-section in accordance with the principles described. Further, the T-section 76 can effectively be converted to an L-section by closing off one of the opposed open end portions 80.

Figure 19:
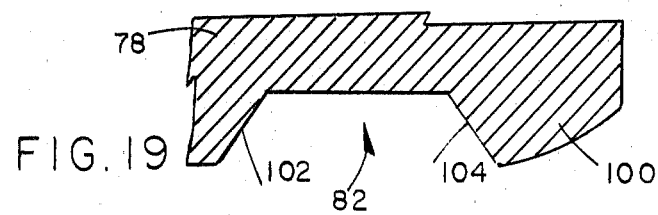
FIG. 19 is a fragmented sectional view of an open end portion of the T-section, showing the constructions of the open end portions of both the tubular members shown in FIGS. 1 and 14 to be similarly constructed.

As can best be observed in FIGS. 19, the end recesses 82 have identical cross sections with the end recesses 18 above described in connection with the tubular members 10. Thus, the end recesses 82 are provided with abutment surfaces 102, 104 which are generally steeper than the outwardly facing tapered engagement surface 100. The same or similar constructions are selected for the end recesses 18 and 82 so that the same connecting means, to be described, can be utilized to interchangeably connect the end portions of both the tubes 10 as well as of the sections 76.

Figure 15:
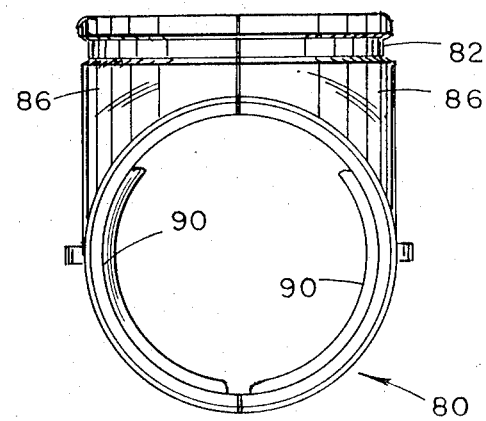
FIG. 15 is an end elevational view of the T-section shown in FIG. 14.
Figure 17:
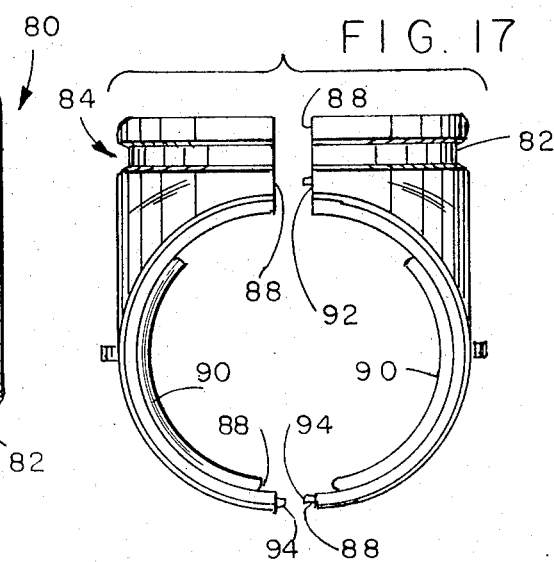
FIG. 17 is similar to FIG. 15, but showing the two mating half sections forming the T-section separated from one another.

As best depicted in FIGS. 15 and 17, the section 76 comprises two mating halves 86 which are separable about lateral edges 88.

In both the tubular members 10 and 76, it should now be clear that each of these tubular members is provided with open end portions 14, 16 on one hand and 80 and 84 on the other hand which define axes substantially coextensive in a common plane. In each case, the tubular members comprise two mating half sections separable from each other at said common plane along lateral edge extending between adjacent sides of open end portions. The opposing lateral edges of associated sections substantially abut against one another in the assembled condition of said tubular members.

Figure 16:
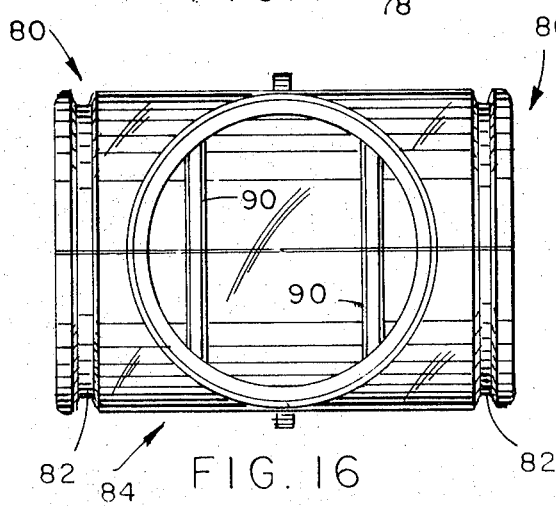
FIG. 16 is a top plan view of the T-section shown in FIGS. 14 and 15.
Figure 18:
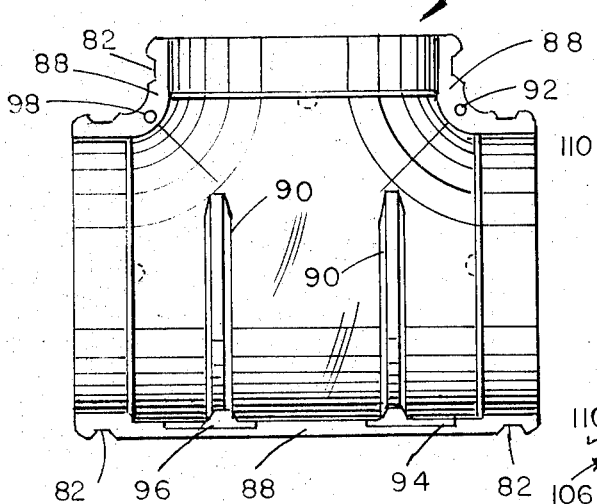
FIG. 18 is similar to FIG. 14, but shown with one of the half sections removed to expose the interior of the T-section.

As can best be viewed in FIGS. 16 and 18, rib segments 90 are provided on the interior surface of the wall 78 to facilitate traction of the animals within the tubular members.

While similar interlocking means can be utilized in conjunction with the tubular members 76 as the interlocking means 28 and 30 describe in connection with the tubular member 10, an alternate interlocking means is illustrated in the form of a pin 92 which projects from the lateral edge 88 on one side of the intermediate open end portion 84. A corresponding hole 98 is provided in the lateral edge 88 on the other side of the intermediate open end portion 84. As suggested in FIG. 17, when the half sections 86 are brought together, the pin 92 on each half section becomes aligned with and is received in the hole 98 of the other section.

Further interlocking means are provided which are similar to those described in connection with the tubular member 10. Thus, an elongate tab 94 projects from the lateral edge 88 and an elongate recess 96 is provided in the same lateral edge. When two mating sections 86 are aligned and brought together, the elongate tab 94 on each half section becomes aligned with and is received in the elongate recess 96 of the other section. Engagement of the pins and holes 92, 98 and the tabs and recesses 94 and 96, as above suggested, locates and prevents relative longitudinal as well as transverse displacement of the half sections 86 relative to one another.

While pins and holes as well as tabs and recesses have been described for locating and locking means, it should be clear that any desired locating or locking means may be utilized, with varying degrees of advantage. The mating halves of the present invention are advantageously provided with such locating means to facilitate interconnection between tubular members and connection of two halves one to the other. However, the specific type of locating means or locking means is not a critical feature of the present invention.

Figures 21, 22:
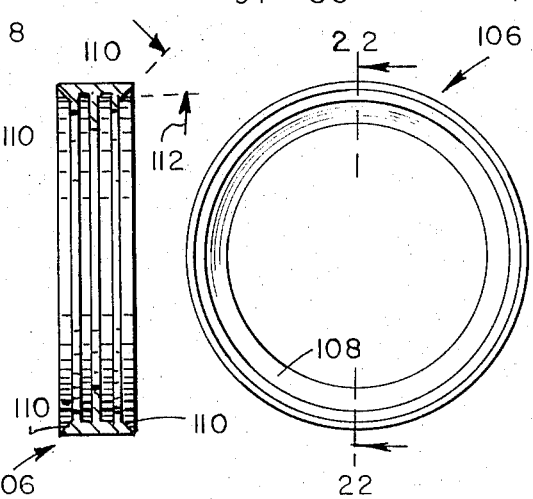
FIG. 21 is a front elevational view of a connecting ring in accordance with the present invention.
FIG. 22 is a cross sectional end view, showing the cross sectional configuration and the inner surface details of the ring shown in FIG. 21.

Another important feature of the present invention is the provision of a connecting means, shown in FIGS. 21 and 22, which releasably cooperate with the open end portion of the tubular members for connecting two mating half sections of a tubular member to one another. The connecting means, shown in the form of a connecting ring, is further adapted to secure two tubular members one to the other.

The connecting ring 106 is advantageously made from a resilient material such as polyethylene.

The connecting ring 106 includes an intermediate wall 108 which extends radially inwardly. Disposed on opposite sides of the intermediate wall 108 are two radial annular ridges which have substantially complementary cross sections to the end recesses 18 and 82. In this manner, the annular ridges 110 are snappingly receivable in the end recesses. In effect, the intermediate wall 108 forms two end recess receiving compartments, each adapted to receive another open end portion of a tubular member. The intermediate wall 108 prevents excessive penetration of an open end portion into the connecting ring. To facilitate entry of the annular ridges 110 into the end recesses 18 and 82, the ridges have leading surfaces defined by angles 112 which are selected to have relatively low values. Typically, angles 112 equal to approximately 30° prove to be satisfactory.

The annular ridges 110 are provided along the internal peripheral surfaces of the connecting ring and are releasably engageable with the external peripheral end recesses provided in the tubular members. Although the ridges 110 are resilient in the presently preferred embodiment and the tapered engagement surfaces 74 and 100 are substantially rigid, this is not critical and the resilient characteristics of either one or both of the engaging members can be altered. In this manner, the connecting ring 106 can be forced onto an open end portion of a tubular member by at least partially deforming an annular ridge 110 and forcing the same into one of the end recesses.

While the above description has been of open end portions and connecting rings which snappingly engage therewith, it should be clear that rings similar to ring 106 can be utilized to connect cooperating open end portions in other conventional ways. Thus, it is possible, for example, for the ring 106 to be provided with an internal thread while each of the open end portions is provided with a corresponding external thread. Further possible connecting means include bayonet type connectors which can engage two opposed open end portions. However, the latter two possibilities are not as convenient to use and generally require more manipulation for connection or separation of the tubular elements.

It should be noted in this connection that it is equally possible to utilize a connecting member having a similar cross section to that shown in FIG. 22 but which does not form a complete annular loop. Instead, the connecting member can form part of a ring or be U-shaped With such construction, it is not necessary to move the tubular members in longitudinal directions with possible disruption of the animal path tubular system. With a U-shaped connecting member, for example, it is possible to merely remove the connecting member from two opposed open end portions by slidingly moving the same in a transverse direction.

The above described construction of the tubular members and of the connecting ring facilitates incorporation into the tube system ventilating means for ventilating tubes as well as blocking means for preventing an animal to move from one tube to another. The ventilating as well as the blocking means are described in connection with FIGS. 23-25. Thus, an apertured plate 114 is shown which includes apertures 116 distributed about its surface. The plate 114 may be made from any suitable material, being made from a thin sheet metal plate in the presently preferred embodiment. The space between each annular ridge 110 of the connecting ring 106 and the intermediate wall 108 is selected to be sufficiently large and the thickness of the apertured plate 114 is selected to be sufficiently small so that a plate 114 can be lodged within the connecting ring in abutment against one or the other side of the intermediate wall 108 without interfering with the snapping engagement of an end recess with an annular ridge 110 on the same side of the intermediate wall 108 as that on which the apertured plate 114 is positioned.

In FIG. 24, the apertured plate is shown to close an open end portion 80 of a T-shaped tubular member 76 while in FIG. 25 an apertured plate 114 is shown to close off an intermediate open end portion 84. Clearly, an apertured plate can be utilized to close off any apertured end portion by interposing an apertured plate between the open end portion and a connecting ring 106 prior to mounting the connecting ring into snapping engagement with the open end portion.

Only one of a numerous number of possible tubular path or passageway combinations is illustrated in FIG. 16. Here, tubes 10 are connected to and extend from both an opposed end portion 80 and an intermediate end portion 84 of a T-shaped tubular member 76. The other opposed open end portion 80 is blocked off by an apertured plate 114. The ends 16 of the tubular members 10 are ready to be further interconnected to other tubular members.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An animal path connecting system comprising a plurality of transparent tubular members each provided with open end portions defining axes substantially co-extensive in a common plane, each tubular member comprising:

two mating half sections separable from each other at said common plane along lateral edges extending between adjacent sides of open end portions, each open end portion including an external peripheral surface having a predetermined configuration, the opposing lateral edges of associated sections substantially abutting against one another in the assembled condition of said tubular members; and connecting means releasably cooperating with said open end portions for connecting two mating half sections of a tubular member to one another, said connecting means further being adapted to secure two tubular members to one another, said connecting means including a complementary internal peripheral surface which is releasably engageable with said external peripheral surface, said external peripheral surface comprising an annular recess and said internal peripheral surface comprising an annular ridge matingly receivable in said annular recess, at least one of said open end portions and said annular ridges being made from a resilient material, whereby said connecting means can be disengaged from said tubular members by at least partially deforming either said recesses or said ridges, said open end portions having outwardly facing annular tapered engagement surfaces substantially facing away from said tubular member, and an adjacent tapered annular abutment surface substantially facing in opposed directions to said outward directions, said abutment surfaces defining greater angles with respect to the axes of the respective end portions than that formed between the axes and said engagement surfaces, whereby engagement of said connecting means with said open end portions requires less force than for disengagement thereof.

2. An animal path connecting system as defined in claim 1, wherein each of said mating half sections are semi-cylindrical in shape.

3. An animal path connecting system as defined in claim 2, wherein said connecting means comprises a cylindrical connecting ring including resilient engaging means at each open end thereof adapted to releasable engage another open end portion of another tubular member.

4. An animal path connecting system as defined in claim 3, wherein each open end portion includes an outer peripheral recess, and wherein said engaging means comprises an annular resilient ridge snappingly receivable in said recess.

5. An animal path connecting system as defined in claim 3, further comprising an annular radially projecting wall between said two engaging means, said wall preventing excessive penetration of an open end portion into said connecting means.

6. An animal path connecting system as defined in claim 3, wherein said connecting ring is made from polyethylene.

7. An animal path connecting system as defined in claim 1, wherein at least one of said tubular members is elongate and has two opposing open end portions.

8. An animal path connecting system as defined in claim 1, wherein at least one of said tubular members is T-shaped and has two opposing open end portions, and an intermediate open end portion having an axis substantially normal to the axes of said two opposing open end portions.

9. An animal path connecting system as defined in claim 1, further comprising tubular member barrier means interposed between two open end portions of associated tubular members for blocking the path therebetween, whereby an animal is prevented from moving from one of the associated tubular members to the other.

10. An animal path connecting system as defined in claim 9, wherein said barrier means comprises an apertured plate.

11. An animal path connecting system comprising a plurality of transparent tubular members each provided with open end portions defining axes substantially coextensive in a common plane, each tubular member comprising:

two mating half sections separable from each other at said common plane along lateral edges extending between adjacent sides of open end portions, the opposing lateral edges of associated sections substantially abutting against one another in the assembled condition of said tubular members; and connecting means releasably cooperating with said end portions for connecting two mating half sections of a tubular member to one another, said connecting means further being adapted to secure two tubular members to one another, said mating half sections mating with each other with some clearance between corresponding opposing lateral edges when said tubular members are assembled, whereby liquid may flow from the interior to the exterior of said tubular member.

12. An animal path connecting system as defined in claim 11, wherein each open end portion includes an external peripheral surface having a predetermined configuration, said connecting means including a complementary internal peripheral surface which is releasably engageable with said external peripheral surface.

13. An animal path connecting system as defined in claim 12, wherein said external peripheral surface comprises an annular recess and said internal peripheral surface comprises an annular ridge matingly receivable in said annular recess.

14. An animal path connecting system as defined in claim 13, wherein at least one of said open end portions and said annular ridges are made from a resilient material, whereby said connecting means can be disengaged from said tubular members by at least partially deforming either said recesses or said ridges.

15. An animal path connecting system as defined in claim 11, wherein said mating half sections are provided with interlocking means along opposing lateral edges, whereby said mating half sections can be accurately located one with respect to the other prior to connection by said connecting means.

16. An animal path connecting system as defined in claim 11, wherein one of said opposing lateral edges is provided along the lengths thereof with a projecting lip, the other of said opposing lateral edges being provided along the length thereof with a recess adapted to receive said projecting lip to provide, when said opposing lateral edges are brought in abutting relation, a ship-lap joint.

17. An animal path connecting system as defined in claim 11, further comprising tubular member ventilating means provided at least at one of said open end portions for closing the latter and permitting a flow of air into and out of said tubular member.

18. An animal path connecting system as defined in claim 22, wherein said ventilating means comprises an apertured plate interposed between an open end portion and a connecting means.

19. An animal path connecting system comprising a plurality of transparent tubular members each provided with open end portions defining axes substantially coextensive in a common plane, each tubular member comprising:

two mating half sections separable from each other at said common plane along lateral edges extending between adjacent sides of open end portions, the opposing lateral edges of associated sections substantially abutting against one another in the assembled condition of said tubular members; and connecting means releasably cooperating with said end portions for connecting two mating half sections of a tubular member to one another, said connecting means further being adapted to secure two tubular members to one another, one of said opposing lateral edges being provided along the length thereof with a projecting pin, the other of said opposing lateral edges being provided with a hole adapted to receive said projecting pin, whereby said pin and said hole aid in locating said half sections prior to connecting by said connecting means.

20. An animal path connecting system as defined in claim 19, further comprising ribs projecting from the internal surfaces of said tubular members which facilitate traction of the animals within said tubular members.

21. An animal path connecting system as defined in claim 20, wherein said ribs project from said internal surfaces a distance sufficiently small to prevent gnawing of said ribs by said animals.

22. An animal path connecting system as defined in claim 20, wherein said ribs are made from a gnaw-resistant material.

23. An animal path connecting system as defined in claim 22, wherein said ribs are made from clear polystyrene.

24. An animal path connecting system comprising a plurality of transparent tubular members each provided with open end portions defining axes substantially coextensive in a common plane, each tubular member comprising:

two mating half sections separable from each other at said common plane along lateral edges extending between adjacent sides of open end portions, the opposing lateral edges of associated sections substantially abutting against one another in the assembled condition of said tubular members; and connecting means releasably cooperating with said end portions for connecting two mating half sections of a tubular member to one another, said connecting means further being adapted to secure two tubular members to one another, said mating half sections being provided with interlocking means along opposing lateral edges, whereby said mating half sections can be accurately located one with respect to the other prior to connection by said connecting means, said interlocking means comprising a projecting tab on one side of said opposing lateral edges and a mating recess in said other of said opposing lateral edges adapted to receive said tab.

* * * * *